(12) United States Patent
Cullen

(10) Patent No.: US 6,273,060 B1
(45) Date of Patent: Aug. 14, 2001

(54) METHOD FOR IMPROVED AIR-FUEL RATIO CONTROL

(75) Inventor: Michael John Cullen, Northville, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/481,316

(22) Filed: Jan. 11, 2000

(51) Int. Cl.$^7$ .............................. F02M 51/00; F02D 41/12
(52) U.S. Cl. ......................... 123/325; 123/327; 123/361; 123/399; 123/492; 123/493
(58) Field of Search ................................. 123/492, 493, 123/325, 327, 361, 399

(56) References Cited

U.S. PATENT DOCUMENTS

| | | |
|---|---|---|
| 4,237,830 * | 12/1980 | Stivender ............................. 123/493 |
| 4,357,923 | 11/1982 | Hidig . |
| 4,771,752 * | 9/1988 | Nishimura et al. .................. 123/399 |
| 4,903,668 | 2/1990 | Ohata . |
| 4,922,877 | 5/1990 | Nagaishi . |
| 5,095,874 * | 3/1992 | Schnaibel et al. ................... 123/361 |
| 5,469,826 * | 11/1995 | Thomas et al. ...................... 123/493 |
| 5,474,052 | 12/1995 | Aquino et al. . |
| 5,492,102 * | 2/1996 | Thomas et al. ...................... 123/493 |
| 5,546,910 | 8/1996 | Messih et al. . |
| 5,564,393 | 10/1996 | Asano et al. . |
| 5,584,277 | 12/1996 | Chen et al. . |
| 5,609,139 | 3/1997 | Ueda et al. . |
| 5,746,182 | 5/1998 | Nada . |
| 5,746,183 | 5/1998 | Parke et al. . |
| 5,765,533 | 6/1998 | Nakajima . |
| 5,935,188 | 10/1999 | Jaye . |

* cited by examiner

*Primary Examiner*—Erick Solis
(74) *Attorney, Agent, or Firm*—John Buckert

(57) ABSTRACT

An engine control method for improving air-fuel ratio control controls airflow when fuel injector limits are reached. The method includes a transient fuel model to calculate a required fuel injection amount based on actual cylinder air charge and feedback from an exhaust sensor. When the required fuel injection amount is outside an operable range, for example, less than zero, airflow is controlled to prevent deviations of exhaust air-fuel ratio. Otherwise, airflow is controlled to provide a desired engine torque. Alternatively, a minimum allowable airflow is determined based on a minimum achievable fuel flow. Then, airflow is prevented from falling below this minimum allowable airflow. The method is particularly useful in preventing rich excursions during rapid decreases in desired engine torque, such as during a driver tip-out.

29 Claims, 5 Drawing Sheets

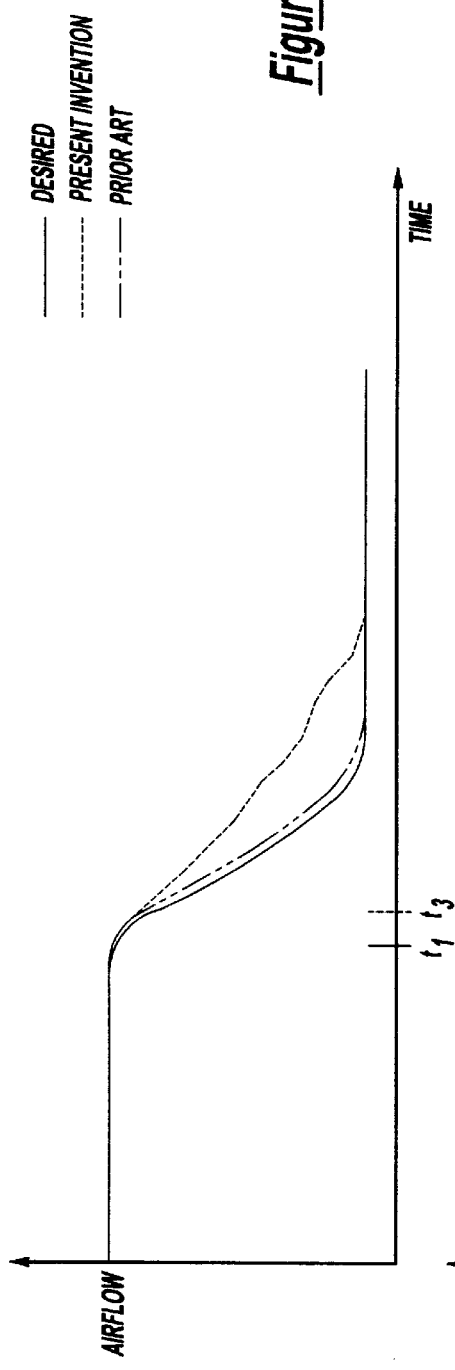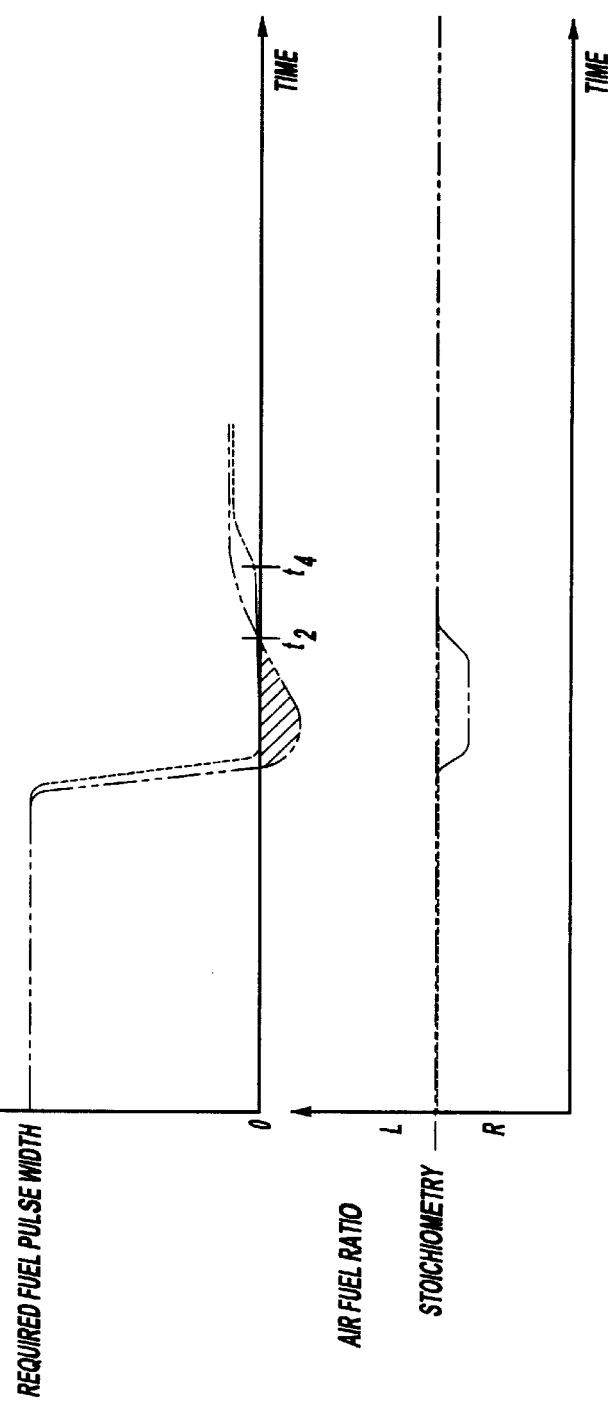

METHOD FOR IMPROVED AIR-FUEL RATIO CONTROL

FIELD OF THE INVENTION

The invention relates to a system and method for controlling an internal combustion engine coupled to an emission control device.

BACKGROUND OF THE INVENTION

In port fuel injected engines operating with a three way catalytic converter, it is desired to maintain near stoichiometric conditions during most operating conditions. Such control is especially difficult during transient conditions where airflow is rapidly changing. Any significant deviations from stoichiometry, either rich or lean of stoichiometry, are outside the operating window of the three way catalytic converter and tend to degrade emission performance. Thus, various methods have been used to improve air-fuel ratio control.

A common approach to improve air-fuel control is to use a so called transient fuel algorithm as is known to those skilled in the art. In this approach, fueling delays and fuel storage (puddling) in the intake manifold are taken into consideration when controlling fuel injectors. In other words, these transient fuel algorithms account for fuel supplied from both fuel injectors and from the manifold fuel puddle to the cylinder.

Continuing with this approach, a desired cylinder fuel amount is found from measured or estimated cylinder air charge. Then, the desired cylinder fuel amount is used to calculate a required fuel injection amount, taking manifold fuel puddling into consideration.

Finally, the required fuel injection amount is used to calculate an injector pulse width, or opening duration. In this way, air-fuel ratio can be more accurately controlled to stoichiometric conditions. Such a system is described in U.S. Pat. No. 5,746,183.

It is also known to control airflow to provide a desired engine torque. In certain conditions, such as during tip-out conditions where a vehicle operator removes their foot from the accelerator pedal, it might be desirable to rapidly reduce engine airflow to rapidly reduce engine torque.

The inventors herein have recognized a disadvantage with known approaches for controlling air-fuel ratio with transient fuel algorithms during such rapid airflow transients. In particular, during these tip-out situations, transient fuel algorithms determine that fuel needs to be taken out of the intake ports since excessive fuel is being supplied by the manifold fuel puddle. However, such action is not possible since conventional fuel injectors can only inject fuel into the intake ports. Therefore, the best that the fuel injectors can perform is to inject no fuel. As a result, a rich excursion occurs and emission performance is degraded. In other words, even when no fuel is injected by fuel injectors, fuel in excess of the stoichiometric ratio is inducted from the manifold fuel puddle into the cylinder.

SUMMARY OF THE INVENTION

An object of the invention claimed herein is to provide a method for controlling fuel injection and airflow wherein improved emission control is achieved.

The above object is achieved, and disadvantages of prior approaches overcome, by a control method for an internal combustion engine having at least one cylinder, the engine combusting a mixture of air and fuel in the at least one cylinder, the engine coupled to a first control device and a second control device. The method comprises determining a desired value of an engine operating parameter, wherein said operating parameter is affected by a first variable and a second variable, wherein said first variable is controlled by the first control device and said second variable is controlled by the second control device, and controlling said operating parameter to said desired value by adjusting said first control device when said second control device is at an operational limit.

By recognizing that there is a minimum possible fueling control, it is possible to control air when fuel control reaches this minimum limit, thereby maintaining robust air-fuel control. For example, in one embodiment of the present invention, during tip-out conditions where it is desired to rapidly reduce engine torque while maintaining stoichiometric conditions, airflow is allowed to rapidly decrease until fuel injection timing reaches a lower threshold, which could be zero. After this, airflow is limited so that required fuel injection timing stays within acceptable limits.

Similarly, there is a maximum fuel control on tip-ins that can be achieved. Again, by recognizing this maximum limit, airflow can be used to maintain a desired air-fuel ratio.

An advantage of the above aspect of the present invention is improved air-fuel control.

Another advantage of the above aspect of the present invention is improved air-fuel control during tip-out conditions.

In an alternate embodiment, the above object is achieved and disadvantages of prior approaches overcome by a method for controlling an internal combustion engine having at least one cylinder communicating with an intake manifold, the intake manifold coupled to an airflow control device, the airflow control device for adjusting an airflow, the engine also coupled to a fuel injector. The method comprises determining a minimum achievable fuel flow into the cylinder, calculating a minimum desired airflow based on said minimum achievable fuel flow into the cylinder, and controlling the airflow control device to provide at least said minimum desired airflow.

By controlling airflow so that that at least the airflow needed to maintain a desired air-fuel ratio at the minimum allowing fuel injection amount, rich excursions during tip-out conditions are avoided.

An advantage of the above aspect of the present invention is improved air-fuel control.

Other objects, features and advantages of the present invention will be readily appreciated by the reader of this specification.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein:

FIGS. 5A, 5B, and 5C are graphs showing an example of operation of the present invention.

DETAILED DESCRIPTION OF THE INVENTION

Figure 1:
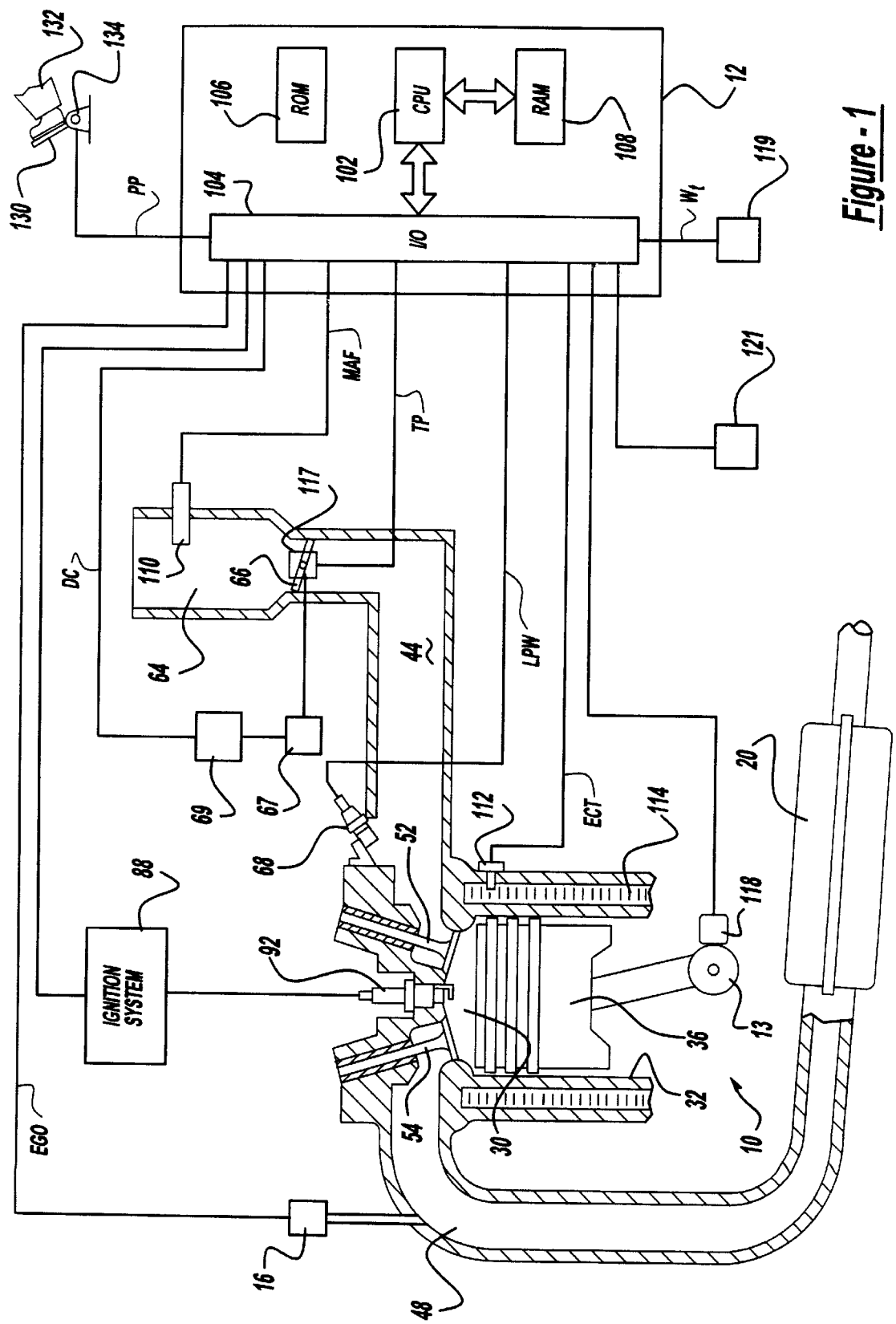
FIG. 1 is a block diagram of an embodiment wherein the invention is used to advantage.

Internal combustion engine 10 comprising a plurality of cylinders, one cylinder of which is shown in FIG. 1 is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20. In a preferred embodiment, sensor 16 is a HEGO sensor as is known to those skilled in the art.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of transmission shaft torque, or engine shaft torque from torque sensor 121, a measurement of turbine speed (Wt) from turbine speed sensor 119, where turbine speed measures the speed of shaft 17, and a profile ignition pickup signal (PIP) from Hall effect sensor 118 coupled to crankshaft 13 indicating an engine speed (N). Alternatively, turbine speed may be determined from vehicle speed and gear ratio.

Continuing with FIG. 1, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

Figure 2:
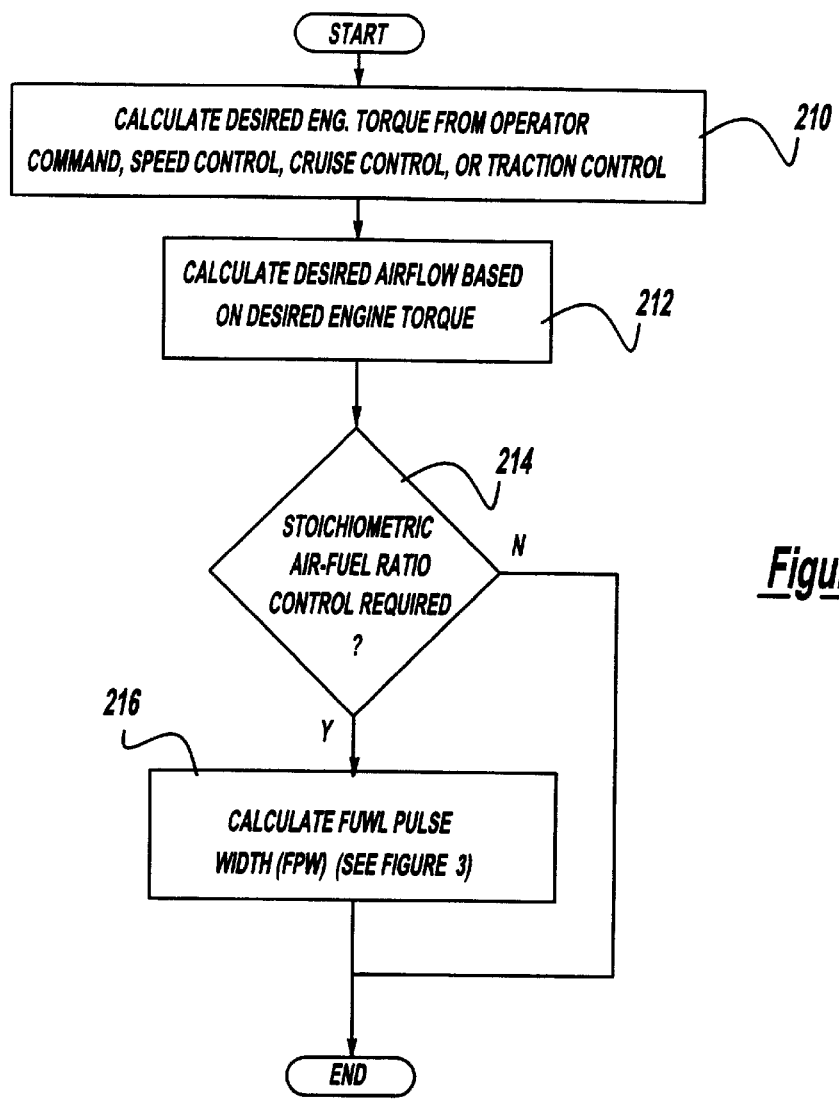
FIGS. 2–4 and 6 are high level flow charts of various operations performed by a portion of the embodiment shown in FIG. 1.

Referring now to FIG. 2, a routine is described for calculating fuel pulse width signal (FPW) based on a desired engine torque. First, in step 210, a desired engine torque is calculated based on at least one of the following: an operator command; a speed control operation; a cruise control operation; a traction control operation; or an idle speed control system. Next, in step 212, a desired airflow is calculated based on the desired engine torque. Those skilled in the art will recognize various methods for calculating a desired airflow that will produce a desired engine torque. For example, a predetermined table can be used where from desired engine torque and engine speed, a desired airflow is calculated. Next, in step 214, a determination is made as to whether stoichiometric air-fuel ratio control is required. When the answer to step 214 is YES, a fuel pulse width is calculated based on various operating conditions as described later herein with particular reference to FIG. 3.

Figure 3:
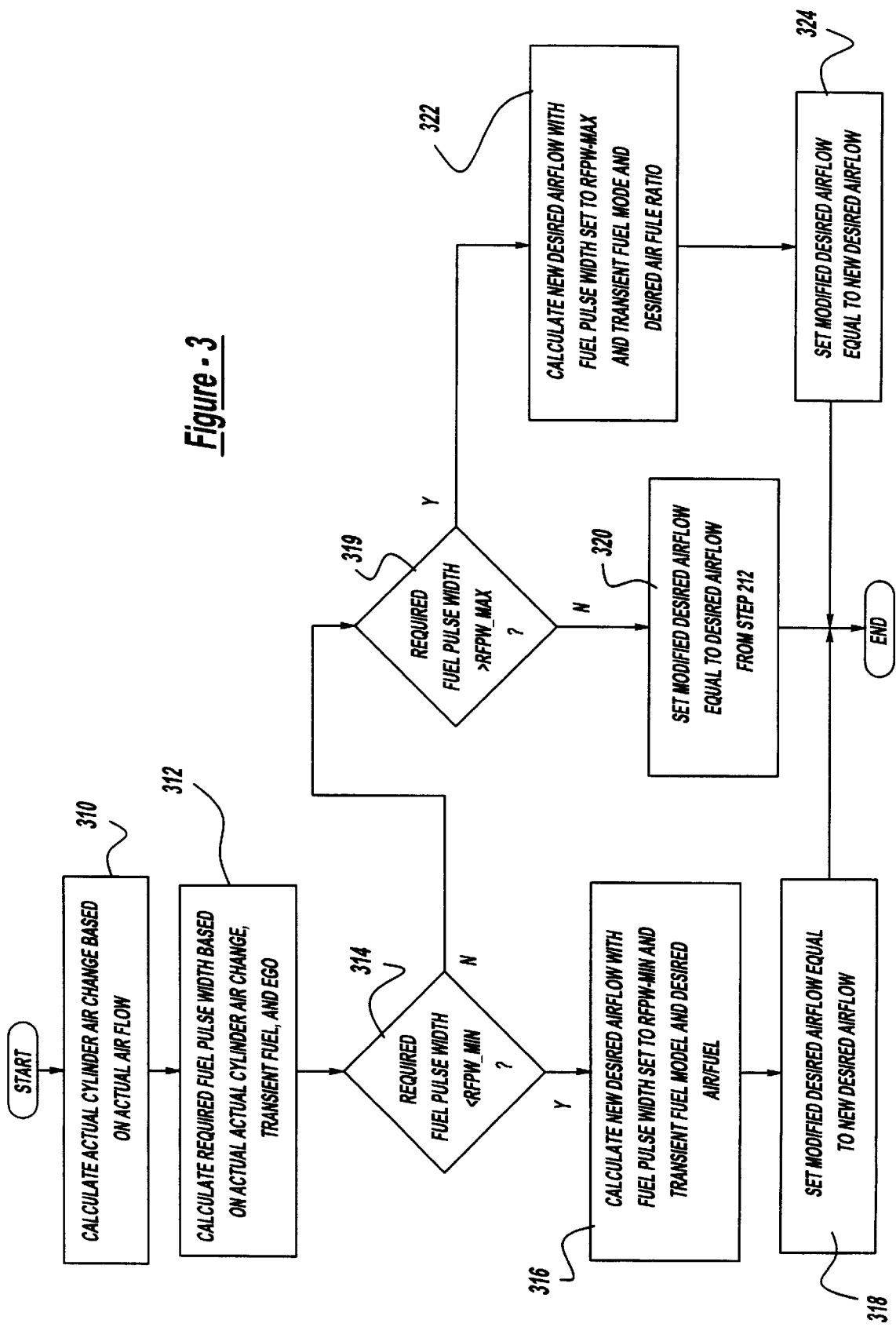

Referring now to FIG. 3, a routine is described for calculating the fuel pulse width signal so that a desired air-fuel ratio can be accurately provided.

First, in step 310, an actual cylinder air charge is calculated based on airflow measured from mass airflow sensor (MAF). Those skilled in the art will recognize various methods of calculating a cylinder air charge based on a measured airflow such as, for example, filtering the measured airflow to determine the actual cylinder air charge trapped in the cylinder. Next, in step 312, a required fuel injection amount, or required fuel pulse width, is calculated based on the actual cylinder air charge, a transient fuel model, and signal EGO from the exhaust sensor. In other words, a required fuel injection amount is determined so that the actual fuel provided to the cylinder matches the calculated cylinder air charge and the desired air-fuel ratio is provided. Further, this amount may be adjusted based on signal EGO. Those skilled in the art will recognize various methods of calculating a required fuel injection amount, or fuel pulse width, based on measured airflow, a transient fuel model, and signal EGO. For example, the required fuel injection amount can be increased when signal EGO indicates that the engine is operating lean of stoichiometry. Alternatively, the required fuel injection amount can be decreased when signal EGO indicates that the engine is operating rich of stoichiometry. Also, various transient fuel models are available that describe the delays and dynamic effects of injecting fuel into the intake port of an internal combustion engine and how this fuel migrates to the cylinder. In a preferred embodiment the transient fuel model in U.S. Pat. No. 5,746,183, which is incorporated herein by reference, is used.

Continuing with FIG. 3, in step 314, a determination is made as to whether the required fuel pulse width is less than predetermined variable (MIN_PW). In other words, a determination is made as to whether the required fuel pulse width is less than a limit value that represents the operable limits of fuel injector 68. Thus, when the answer to step 314 is YES, the calculations of step 312 are requesting the fuel injector to inject less fuel or negative fuel, both of which are outside the operation limits of the fuel injector. Then, in step 316, a new desired airflow is calculated with the fuel injectors set at the minimum possible fuel injection amount. In other words, in step 316, the transient fuel model is used to determine the required airflow that would match the fuel entering the cylinder when the actual fuel injection amount is set to predetermined value (MIN_PW). In this way, the airflow can be controlled so that the desired airflow is achieved even when the fuel injector is at its operable limit. Next, in step 318, the modified desired airflow is set equal to the new desired airflow calculated at step 316.

Thus, according to the present invention, if the method described in step 312 requests the fuel injector to inject, for example, less than zero fuel, airflow is then controlled to provide the desired air-fuel ratio. In this way, it is possible to prevent rich excursions during such conditions, thereby provided improved air-fuel ratio control.

When the answer to step 314 is NO, a determination is made in step 319 as to whether the required fuel pulse width is greater than a predetermined value (rfpw_max). When the answer to step 319 is NO, the required fuel pulse width is within the operable limits of the fuel injector and in step 320 the modified desired airflow is set equal to the desired airflow determined in step 212. Otherwise, when the answer to step 319 is YES, the routine is determined that the required fuel injection amount, required fuel pulse width, is greater than the maximum available fuel injection amount. Then, in step 322, a new desired airflow is calculated with the fuel injection amount set to the maximum fuel injection amount as represented by predetermined parameter (rfpw_max). Further, in step 322, the new desired airflow is calculated using transient fuel model and the desired airflow, similar to the operation in step 316. In step 324, the modified desired airflow is set equal to the new desired airflow. In this way, when the required fuel injection amount is greater than that which can be achieved by the fuel injector, airflow is then controlled to provide the desired air-fuel ratio while the fuel injection is set at the maximum value as represented by the predetermined value (rfpw_max).

Thus, according to the present invention, it is possible to provide a desired air-fuel ratio even during conditions when, due to transient fueling dynamics, it is required to inject more or less fuel than physically possible. According to the present invention, this improves controls provided by setting the fuel injection amount at the limit value, and then using airflow to control air-fuel ratio.

Figure 4:
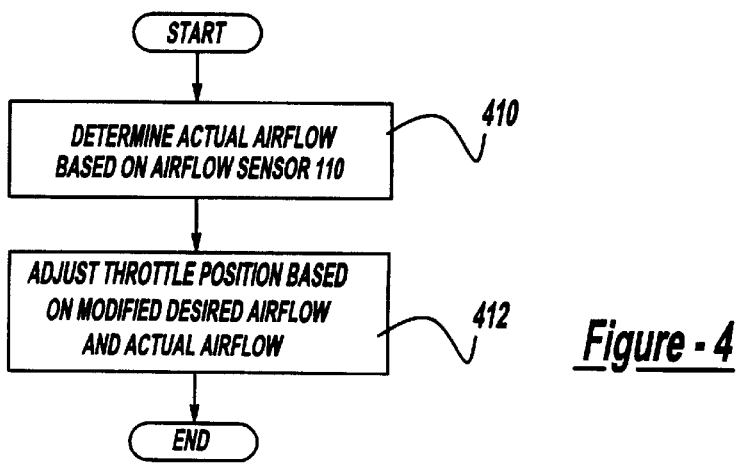

Referring now to FIG. 4, a routine is described to determine the throttle position of the throttle. First, in step 410, an actual airflow is determined based on airflow sensor 110. Next, in step 412, the throttle position is adjusted based on the modified desired airflow and the actual airflow. In this way, the throttle position is controlled to provide the desired airflow. The desired airflow can come from the torque control operation where airflow is used to control torque, or from the routine described in FIG. 3 where the airflow is used to control the air-fuel ratio.

Referring now to FIGS. 5A, 5B, and 5C, graphs are shown indicating operation according to the present invention compared to operation according to the prior art. In FIG. 5A, airflow is shown versus time. In FIG. 5B, the required fuel pulse width is shown versus time. In FIG. 5C, air-fuel ratio is shown versus time.

Referring now specifically to FIG. 5A, the desired airflow is shown by the solid line, actual airflow wherein control is shown, according to the present invention, by dashed line, and actual airflow, according to the prior art, is shown by the dashed dot line. In this example, at time T1, the desired airflow is rapidly reduced to a new level. In the prior art systems, actual airflow closely follows the desired airflow throughout the entire trajectory. As shown in FIG. 5B, the required fuel pulse width, according to the prior art approach, rapidly reduces to zero. Then, the required fuel pulse width according to the prior art reduces below zero and time T2 rises above zero. The shaded region shown in FIG. 5B represents the amount of fuel that the transient fuel model indicated should have been taken out of the intake manifold to provide the desired air-fuel ratio. However, since with conventional systems this is not possible, as shown in FIG. 5C, the air-fuel ratio has a rich excursion during this time period.

According to the present invention, as shown in FIG. 5A, the actual airflow at first follows the desired airflow trajectory. However, at time T3, when, as shown in FIG. 5B, the required fuel pulse width reaches zero, the actual airflow reduces at a slower rate. Then, at time T4, when the required fuel pulse width, according to the present invention, comes above the minimum allowable amount, the actual airflow can then be reduced to the desired level. As shown in the plot of FIG. 5C, the air-fuel ratio of the present invention is more accurately controlled to the desired stoichiometric level. This result is possible using the embodiment described above herein, or an alternative embodiment now described.

Figure 6:
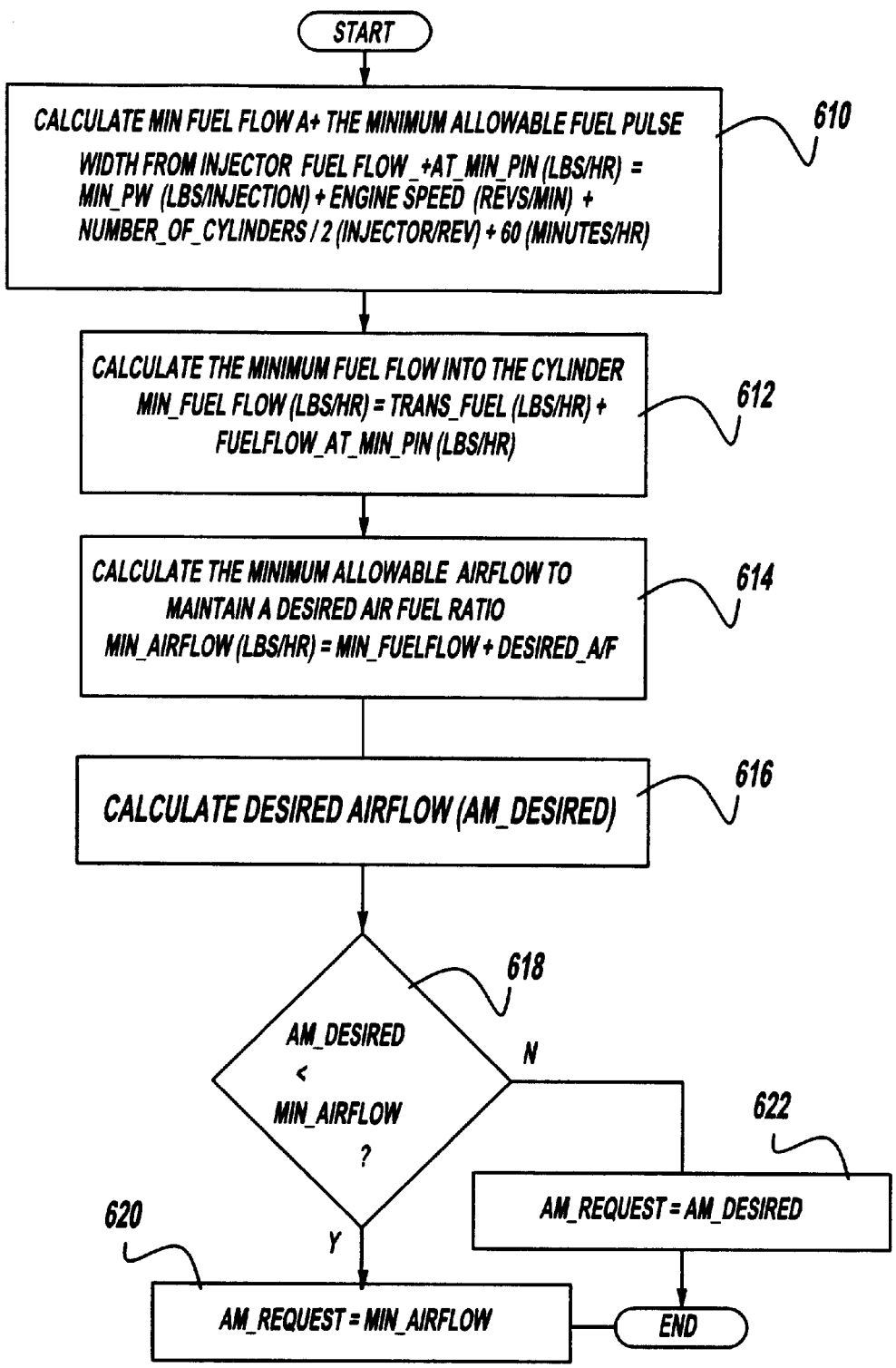

In the alternative embodiment, which is the preferred embodiment, a routine as in FIG. 6 is used. In this preferred embodiment, desired airflow is adjusted based on a minimum allowable airflow, wherein the minimum allowable airflow is calculated recognizing the minimum allowable fuel pulse width and effects from transient fuel phenomenon.

Continuing with FIG. 6, in step 610, the minimum fuel flow from the fuel injector (MIN_FUELFLOW_AT_MIN_PW in lbs/hr) at the minimum allowable fuel pulse width (MIN_PW in lbs/injection) is calculated based on engine speed (ENGINE_SPEED in revs/min), the number of cylinders (NUMBER_OF_CYLINDERS).

Then, in step 612, the minimum fuel flow into the cylinders (MIN_FUELFLOW in lbs/hr), taking into account transient fuel (TRANS_FUEL in lbs/hr), is calculated by adding TRANS_FUEL and MIN_FUELFLOW_AT_MIN_PW. Then, in step 614, the minimum allowable airflow (MIN_AIRFLOW) to maintain a desired air-fuel ratio (DESIRED_A/F) is calculated based on MIN_FUELFLOW. Then, in step 616, the desired airflow (AM_DESIRED) is determined using various methods as described above herein with respect to FIG. 2. For example, an idle speed controller, and engine torque controller, or various other controllers can be calculating a desired airflow for a variety of purposes.

Next, in step 618, a determination is made as to whether desired airflow (AM_DESIRED) is less than minimum allowable airflow (MIN_AIRFLOW). When the answer to step 618 is YES, the a determination has been made that the airflow must be limited to prevent a rich excursion since the fuel injection system would be required to inject less fuel than is possible. In particular, in step 620, modified desired airflow (AM_REQUEST), which is used in FIG. 4, is set equal to minimum allowable airflow (MIN_AIRFLOW). In an alternative embodiment, in step 620, modified desired airflow (AM_REQUEST) can be adjusted based on signal EGO from sensor 16. For example, if signal EGO indicates lean, modified desired airflow (AM_REQUEST) is decreased by a predetermined amount. If signal EGO indicates rich, modified desired airflow (AM_REQUEST) is increased by a predetermined amount. Otherwise, in step 622, modified desired airflow (AM_REQUEST) is set equal to desired airflow (AM_DESIRED).

Thus, according to the present invention, it is possible to provide a desired air-fuel ratio even during conditions when, due to transient fueling dynamics, it is required to inject less fuel than physically possible. This preferred embodiment can provide the same results shown in FIGS. 5A, 5B, and 5C. This preferred embodiment acts in a proactive way rather than a reactive way as described in FIG. 3. Those skilled in the art will recognize that both embodiments can be used to advantage to improve air-fuel ratio control, particularly during tip-out conditions.

Although several examples of embodiments which practice the invention have been described herein, there are numerous other examples which could also be described. For example, the invention can also be used with direct injection engines wherein fuel is injected directly into the engine cylinder. Also, the invention is applicable with various types of transient fuel algorithms, including those implemented in either the time domain or the event domain. The invention is therefore to be defined only in accordance with the following claims.

What is claimed is:

1. A control method for an internal combustion engine having at least one cylinder, the engine combusting a mixture of air and fuel in the at least one cylinder, the engine coupled to at least a first control device and a second control device, the method comprising:
   determining a desired value of an engine operating parameter, wherein said operating parameter is affected by a first variable controlled by the first control device and a second variable controlled by the second control device;
   controlling said operating parameter to said desired value by adjusting said first control device based on an output from a sensor communicating with exhaust gases from said cylinder, when said second control device is at an operational limit.

2. The method recited in claim 1 wherein said engine operating parameter is an air-fuel ratio of the mixture.

3. The method recited in claim 2 wherein said first variable is an airflow.

4. The method recited in claim 2 wherein said second variable is an fuel injection amount.

5. The method recited in claim 4 wherein the first control device is an electronically controlled throttle and the second control device is a fuel injector.

6. The method recited in claim 1 wherein said operational limit is an extreme value of operation.

7. The method recited in claim 6 wherein said second control device is a fuel injector and wherein said operational limit represents injecting zero fuel.

8. The method recited in claim 6 wherein said second control device is a fuel injector and wherein said operational limit represents injecting a maximum fuel amount.

9. A method for controlling an internal combustion engine having at least one cylinder communicating with an intake manifold, the intake manifold coupled to a throttle for adjusting an airflow, the intake manifold also coupled to a fuel injector, the method comprising:
   determining a required fuel injection amount based on air entering the engine;
   calculating a desired airflow when said required fuel injection amount is less than a predetermined value; and
   controlling the throttle based on said desired airflow.

10. The method recited in claim 9 wherein calculating further comprises calculating said desired airflow by setting said desired airflow equal to a required airflow with said fuel injection amount set to said predetermined value.

11. The method recited in claim 10 wherein said predetermined value is zero.

12. The method recited in claim 10 wherein said calculating further comprises calculating said desired airflow by setting said desired airflow equal to a required airflow, wherein said required airflow is determined using a model representing transient fueling dynamics.

13. The method recited in claim 11 wherein said controlling further comprises controlling the throttle so that actual airflow approaches said desired airflow.

14. The method recited in claim 10 wherein said predetermined value is a maximum fuel injection amount.

15. The method recited in claim 11 wherein said required fuel injection amount is a required fuel pulse width.

16. The method recited in claim 9 wherein an exhaust gas sensor is coupled to the engine, the method further comprising:
   adjusting said desired airflow based on said exhaust gas sensor when said required fuel injection amount is less than a predetermined value; and
   controlling the throttle based on said adjusted desired airflow.

17. An article of manufacture comprising: a computer storage medium having a computer program encoded therein for controlling an internal combustion having at least one cylinder communicating with an intake manifold, the intake manifold coupled to a throttle, the intake manifold also coupled to a fuel injector, said computer storage medium comprising:
   code for determining a required fuel injection amount based on air entering the engine;
   code for determining a desired airflow based on a driver actuation signal;
   code for calculating a required airflow based on a limit value fuel injection amount; and
   code for controlling the throttle based on said desired airflow when said required fuel injection amount is inside a predetermined range; and
   code for controlling the throttle based on said required airflow when said required fuel injection amount is outside said predetermined range.

18. The article recited in claim 17 wherein said code for calculating further comprises code for calculating said required airflow based on said limit value fuel injection amount and a transient fueling model.

19. The article recited in claim 17 wherein said code for calculating further comprises code for calculating said required airflow based on said limit value fuel injection amount and a feedback signal from an exhaust sensor.

20. The article recited in claim 17 wherein said limit value represents an endpoint of said predetermined range.

21. The article recited in claim 20 wherein said driver actuated signal is a pedal position.

22. A method for controlling an internal combustion engine having at least one cylinder communicating with an intake manifold, the intake manifold coupled to an airflow control device, the airflow control device for adjusting an airflow, the engine also coupled to a fuel injector, the method comprising:
   determining a minimum achievable fuel flow into the cylinder;
   calculating a minimum desired airflow based on said minimum achievable fuel flow into the cylinder; and
   controlling the airflow control device to provide at least said minimum desired airflow.

23. The method recited in claim 22 wherein said controlling further comprises controlling the airflow control device to provide said minimum desired airflow when a desired airflow is less than said minimum desired airflow, where said desired airflow is determined from operating conditions.

24. The method recited in claim 22 wherein said minimum achievable fuel flow into the cylinder is determined based on a minimum possible fuel pulse width.

25. The method recited in claim 22 wherein said minimum achievable fuel flow into the cylinder is determined based on an engine speed.

26. The method recited in claim 22 wherein said minimum achievable fuel flow into the cylinder is determined based on an amount of transient fuel.

27. The method recited in claim 22 wherein said minimum desired airflow is based on a desired air-fuel ratio.

28. A control method for an internal combustion engine having at least one cylinder, the engine combusting a mixture of air and fuel in the at least one cylinder, the engine coupled to an airflow control device and a fuel injector, the method comprising:

determining a desired value of an air/fuel ratio, said air/fuel ratio being affected by an airflow controlled by the airflow control device and a fuel injection amount controlled by the fuel injector; and, controlling said air/fuel ratio to said desired value by adjusting said airflow control device when said fuel injector is at an operational limit, said desired value being a substantially stoichiometric air/fuel ratio.

29. A method for controlling an internal combustion engine having at least one cylinder communicating with an intake manifold, the intake manifold coupled to an airflow control device, the airflow control device for adjusting an airflow, the engine also coupled to a fuel injector, the method comprising:

determining a minimum achievable fuel flow based on a minimum achievable fuel injection amount and an amount of fuel stored in said intake manifold;

calculating a desired airflow based on said minimum achievable fuel flow and a desired air/fuel ratio; and, controlling the airflow control device to provide at least said desired airflow.

* * * * *